(12) United States Patent
van der Jagt et al.

(10) Patent No.: US 9,302,706 B2
(45) Date of Patent: Apr. 5, 2016

(54) ARTICULATED CONNECTION FOR TRANSFERRING A STEERING MOVEMENT ONTO A VEHICLE WHEEL

(71) Applicant: FORD GLOBAL TECHNOLOGIES, LLC, Dearborn, MI (US)

(72) Inventors: Pim van der Jagt, Selfkant (DE); Marc Simon, Köln (DE); Edmund Halfmann, Neuss (DE); Thomas Gerhards, Niederzier (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/252,548

(22) Filed: Apr. 14, 2014

(65) Prior Publication Data

US 2014/0306412 A1   Oct. 16, 2014

(30) Foreign Application Priority Data

Apr. 15, 2013 (DE) .......................... 10 2013 206 642
Apr. 16, 2013 (DE) .......................... 10 2013 206 833

(51) Int. Cl.
*B62D 7/18*  (2006.01)

(52) U.S. Cl.
CPC .............. *B62D 7/18* (2013.01); *B60G 2200/44* (2013.01); *B60G 2206/50* (2013.01)

(58) Field of Classification Search
CPC .............. B62D 7/00; B62D 7/16; B62D 7/18; B62D 7/22; B62D 7/228; B60G 13/006; B60G 2200/44; B60G 2206/11; B60G 2206/50; B21K 1/74
See application file for complete search history.

(56) References Cited

U.S. PATENT DOCUMENTS

| | | | |
|---|---|---|---|
| 2,098,120 A | * | 11/1937 | Williams ........................ 280/90 |
| 4,458,915 A | | 7/1984 | Emery |
| 5,257,821 A | * | 11/1993 | Mauz ....................... 280/93.503 |
| 6,419,250 B1 | | 7/2002 | Pollock et al. |

FOREIGN PATENT DOCUMENTS

| | | |
|---|---|---|
| DE | 10108499 A1 | 4/2002 |
| EP | 1785335 A1 | 5/2007 |
| EP | 1864887 A2 | 12/2007 |
| EP | 1785335 B1 | 1/2011 |
| EP | 2489530 A1 * | 8/2012 |
| JP | H03-21566 A | 1/1991 |
| JP | H11-208501 A | 8/1999 |

OTHER PUBLICATIONS

Examination Report issued in corresponding German Patent Application No. 10 2013 206 642.2, dated Nov. 11, 2013.
Examination Report issued in corresponding German Patent Application No. 10 2013 206 833.6, dated Nov. 18, 2013.

* cited by examiner

*Primary Examiner* — Ruth Ilan
*Assistant Examiner* — Timothy Wilhelm
(74) *Attorney, Agent, or Firm* — Jones Robb, PLLC; Raymond L. Copiellie (57) ABSTRACT

An articulated connection can be used to transfer a steering movement to a vehicle wheel. The articulated connection can include an axle journal and a steering arm. The axle journal can be configured to be coupled to the wheel. The steering arm can be configured to receive and transfer the steering movement to the axle journal. The steering arm can be bendable so as to elastically deflect with respect to the axle journal. The steering arm can be curved along a portion of its length and/or the articulated connection can include a limiting device. The limiting device can be configured to limit an amount of deflection of the steering arm in at least one direction.

20 Claims, 9 Drawing Sheets

ARTICULATED CONNECTION FOR TRANSFERRING A STEERING MOVEMENT ONTO A VEHICLE WHEEL

CROSS REFERENCE TO RELATED APPLICATIONS

This application claims priority to German Application No. 102013206642.2, filed on Apr. 15, 2013, and to German Application No. 102013206833.6, filed on Apr. 16, 2013, the entire contents of which are incorporated by reference herein.

TECHNICAL FIELD

The present disclosure relates generally to vehicle steering systems, and more particularly, to an articulated connection for transferring a steering movement to a wheel of a vehicle.

BACKGROUND

In multi-axle, non-rail-borne motor vehicles, the direction of travel is determined by the position of the wheels relative to one another. Changes in direction are first initiated by a steering movement, as a result of which the positions of the wheels relative to one another are changed. Modern vehicles are expected to offer agility and smooth handling when traveling around bends at low to medium speeds, but also must provide a high level of stability at high speeds. At such high speeds, steering that is too direct can lead to critical or even uncontrollable driving conditions.

Driving performance is thus a function of the speed at which the steering movement takes place, particularly in the case of four-axle and multi-axle vehicles. It is important in this context to find a suitable balance between agility and stability in order to meet the requirements of comfort and safety. This may involve a compromise between a low steering ratio (e.g., for improved agility) and an increased tendency for the vehicle to have an understeering design (e.g., for improved stability at high speeds).

Front-wheel drive vehicles, in particular, may have a limited potential for understeer due to the location of steering gears behind the mid-point of the front wheels. A solution to increase the understeering tendency employs rubber parts within the steering chain, but the rubber parts introduce hysteresis to the steering system that can lead to inaccurate interactions of the steering components.

With this in mind, the object of the present disclosure is to provide improved articulated connections for transferring steering movements to a wheel of the vehicle that can effectively balance agility and stability performance.

SUMMARY

In accordance with various exemplary embodiments, the present disclosure provides an articulated connection for transferring a steering movement to a vehicle wheel, the articulated connection comprising an axle journal, a steering arm, and a limiting device. The axle journal can be configured to be coupled to the wheel. The steering arm can be configured to receive and transfer the steering movement to the axle journal. The steering arm can be bendable so as to elastically deflect with respect to the axle journal. The limiting device can be configured to limit an amount of deflection of the steering arm in at least one direction. The steering arm and the axle journal can be formed as an integral component from a single material.

The present disclosure also provides an articulated connection for transferring a steering movement to a vehicle wheel, the articulated connection comprising an axle journal and a steering arm. The axle journal can be configured to be coupled to the wheel. The steering arm can be coupled to the axle journal and can be configured to receive and transfer the steering movement to the axle journal. The steering arm can be bendable so as to elastically deflect with respect to axle journal. The steering arm can be constructed to elastically deflect within a bending plane and can have an arm section with a curvature in the bending plane. The arm section can have a rectangular cross-section with a height perpendicular to the bending plane and a width in the bending plane. The height of the rectangular cross-section can be greater than the width of the rectangular cross-section.

The present disclosure also provides an articulated connection comprising an axle journal and a steering arm. The axle journal can be configured to be coupled to a wheel of a vehicle. The steering arm can have a coupling section configured to attach the steering arm to a steering linkage of the vehicle. The steering arm can be coupled to the axle journal via a base of the steering arm so as to convert a translational steering movement applied to the coupling section of the steering arm into a rotational movement of the axle journal. The steering arm can be curved along at least a portion of its length such that the portion is spaced, in a direction parallel to the translational steering movement, from a line connecting the coupling section and the base.

The present disclosure also provides an articulated connection comprising an axle journal, a steering arm, and one or more limiting devices. The axle journal can be configured to be coupled to a vehicle wheel. The steering arm can extend from the axle journal and can have a coupling section configured to attach the steering arm to a steering linkage of the vehicle. The steering arm can convert a translational steering movement applied to coupling section of the steering arm into a rotational movement of the wheel coupled to the axle journal. The one or more limiting devices can be spaced from the steering arm and can be disposed so as to limit a displacement of at least a portion the steering arm in a direction parallel to the translational steering movement.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, an articulated connection can be used to transfer the steering movement to the wheel of a vehicle. The articulated connection can have an axle journal with a flexible steering arm disposed thereon. The steering arm can be connected to a steering linkage and can be designed to flex such that the steering arm can be elastically deflected in relation to the axle journal. When a transverse load of sufficient force is applied to the steering arm, it bends in relation to the axle journal, which leads to an increase in the desired understeer of the vehicle. As a result, the understeering tendency of a vehicle is improved without an accompanying deterioration in steering accuracy. Furthermore, the stability with respect to the vehicle's driving performance can be improved.

The steering arm can be elastically deflected within at least one bending plane. For example, the steering arm can have a curved arm section, which has a curvature extending within the bending plane. The curved arm section can have a rectangular cross-section that has a height extending perpendicularly to the bending plane and a width within the bending plane. The height of the rectangular cross-section can be greater than its width.

In one or more exemplary embodiments, the steering arm can follow a curved course, at least sectionally. As a result of the curvature, the length of the actual lever arm provided by the steering arm can be enlarged even though a length of the physical lever arm is retained (e.g., the distance of the coupling section of the steering arm from the axle journal). For example, the curved section can be substantially C-shaped or U-shaped in plan view (e.g., within the bending plane). The curved section may be such that the section is spaced from a line connecting a coupling section and the base of the steering arm. Thus, forces applied to the steering arm can be distributed over a greater length. Moreover, the steering arm, for example, the curved arm section thereof, can be designed to achieve a uniform tension distribution over the length of the steering arm. As a result, a steering arm that is low stiffness with respect to higher forces for improved stability and greater agility through a quicker steering ratio may be achieved.

The aforementioned curved arm section can extend over at least 50% of the steering arm extension. Alternatively, the entire length of the steering arm may be curved. Alternatively or additionally, different sections of the steering arm can be flat or curved in an arcuate manner.

The resilience of the steering arm can be selected such that precise steering performance is maintained despite the steering arm's ability to bend under a transverse force. Such transverse forces may occur as reaction forces of the wheel when turning or driving around bends. The cross-sectional form of the steering arm may define the deflection characteristics and capability of the steering arm. Thus, the steering arm can have a modulus of resistance in a direction or directions of the desired elastic deflection capability to provide durability for connected components.

For example, the steering arm and/or a curved arm section thereof can be adapted to withstand the stresses arising from the kinematic chain or that may otherwise occur during use. In one or more embodiments of the disclosed subject matter, the cross-section of the steering arm can vary over the length of the steering arm. For example, progressive cross-sections along the steering arm can vary such that the cross-sections allow a uniform transmission of the loads occurring beyond a region of the steering arm subject to the stress. Other cross-sectional variations that have the desired bending performance are also possible according to one or more contemplated embodiments. For example, the cross-section may vary in a piecewise manner or other non-uniform manner.

In one or more exemplary embodiments, a curved arm section, or any portion thereof, can be configured as a partial section or portion of one of an Archimedean spiral, a logarithmic spiral, and a Fibonacci spiral. The respective form of the arm section can be adapted to the forces to be absorbed and transferred as well as the stresses resulting from within the steering arm.

In one or more exemplary embodiments, the elastic deflection capability of the steering arm need not be limited to the at least one bending plane. Rather, the deflection of the steering arm may take on more complex forms and can be made up of a combination of torsion and uniaxial and/or multi-axial bending, for example. This means, for example, that pure torsion of the steering arm can result from an application of force spaced apart from the plane of the steering arm, i.e., above or below the steering arm. The torsion does not cause deflection of the steering arm within the at least one bending plane, but only leads to torsion of the steering arm. In addition, the torsion may also take place about a single axis of rotation, as well as about a plurality of axes of rotation.

In one or more exemplary embodiments, the elastic deflection of the steering arm can occur over an entire width of the steering arm within at least one bending plane. In other words, at least one bending plane is defined by the elastic deflection of the steering arm, and the bending of the steering lever takes place within the bending plane under the effect of force on the steering lever. In one or more embodiments, the steering arm is configured such that the flexibility thereof is reduced to provide a deflection capacity within only a single bending plane. The curvature of the arm section extends within the bending plane such that each point of the center line of gravity of the steering arm lies within the bending plane.

As a result, loads that occur on the steering arm are limited, for the most part, to axial forces, transverse forces, and bending moments. Torsion moments, if any, result from those forces which are not applied at the level of the center line of gravity of the steering arm or within the bending plane thereof. Such torsion moment producing forces may result from, for example, the attachment of the articulated connection to a steering linkage of the vehicle.

Because the torsion moments are minimized or even prevented by the disclosed configuration, the cross-sectional profile of the steering arm can be better adapted to the requirements for the steering arm. For example, a high torsion load on the steering arm would require a cross-sectional profile that causes excessive stiffness, among other things, resulting in a flexibility of the steering arm that would no longer be adequate.

In one or more exemplary embodiments, the steering arm can be constructed with one or more portions or sections that do not lie within the bending plane. Thus, the design of the steering arm can be adapted to a particular vehicle in terms of its profile based on a spatial configuration, for example, at structural constraint points thereof. As a result, the steering arm can adopt a profile with respect to other components, where necessary, by extending, partially or sectionally, above or below the bending plane.

In one or more exemplary embodiments, the steering arm can have a rectangular cross-section over its entire length. For example, the steering arm can have a substantially constant rectangular cross-section along its length. In another example, the steering arm can have a progressively varying rectangular cross-section along its length. In still another example, the steering arm can have a rectangular cross-section that is different for one or more portions along a length of the steering arm. Other cross-sectional shapes that have the desired bending performance are also possible according to one or more contemplated embodiments. Moreover, the cross-sectional shape need not be uniform along the length of the steering arm. Rather, size and shape variations of the cross-section are possible along the length of the steering arm.

In one or more exemplary embodiments, a rectangular cross-section can prove advantageous with respect to the ratio between the dimensions of the cross-section and the modulus of resistance resulting therefrom. The difference between the height and width of the rectangular cross-section results in a weak axis, which runs parallel to the direction of the height and about which the steering arm can be elastically deflected over its length. In contrast, a strong axis is parallel to the bending plane and results from the cross-sectional height exceeding the cross-sectional width. Thus, any flexibility of the steering arm perpendicular to the bending plane, for example, is significantly reduced or even prevented. As a result, an application of force on the steering arm that is not parallel to the bending plane is substantially transferred to an elastic deflection within the bending plane.

Moreover, any vertical offset of the force-application point in a direction of the cross-sectional height can be balanced in the steering arm by virtue of the cross-section height exceeding the cross-sectional width. This can occur insofar as the application of force in the steering arm does not take place at the height of the center point of gravity thereof or at the height of the bending plane thereof.

In one or more exemplary embodiments of the disclosed subject matter, the cross-section of the curved arm section can taper towards a free end of the steering arm. Because the steering arm acts as a cantilever extending from the axle journal, the greatest moment load generally occurs in a region where the steering arm meets the axle journal while the moment load is at minimum toward a free end of the steering arm. Accordingly, the cross-sectional profile of the steering arm can be adapted to the moment load, which usually changes in linear fashion over the longitudinal extension of the steering arm.

In addition, weight savings can be realized since the amount of material used to form the steering arm can be minimized, or at least reduced, by virtue of the reduced cross-section. Since the articulated connection is part of the unsprung masses of a vehicle chassis, reductions in material and weight can improve ride comfort and driving performance. Moreover, the cross-sectional profile of the steering arm adapted to the moment load allows flexibility over its entire length since its stiffness is not increased in an unwanted manner by unnecessarily large cross-sections of individual sections.

In one or more exemplary embodiments of the disclosed subject matter, the axle journal can include a flange, and the steering arm can have a corresponding base. The steering arm can be connected via its base to the flange of the axle journal, thereby allowing the steering arm to be fabricated separately from the axle journal. By virtue of the subsequent connection of the axle journal and steering arm, these components can each be independently adapted to their respective requirements without being limited to a single material with the same material properties which may compromise the performance of one or both of the components.

The arrangement of the flange and base allows for a simple connection of the steering arm and axle journal. High process reliability with respect to the coupling and alignment of the steering arm and axle journal is made possible by virtue of the precise design of the base and flange during fabrication of the steering arm and axle journal. Moreover, the flange and base configuration for coupling the steering arm and the axle journal allows for simple replacement of a defective steering arm. For example, a new steering arm can be installed on the axle journal without calibration or alignment because the position of the steering arm is clearly defined by the flange and base connection. It also is possible for existing axle journals to be adapted for retrofit attachment to disclosed flexible steering arms, thereby allowing existing vehicles and/or suspension systems to enjoy the advantages of the disclosed articulated connection.

In addition, it is possible to make adjustments to the behavior of vehicle steering for a particular vehicle series by using different types of steering arms with the same axle journal. Thus, the steering behavior in each vehicle can thereby be customized through simple substitution of the steering arm adapted to the respective version style of the vehicle. A number of different steering arms could thus be used in vehicle production while retaining the same configuration of the axle journal for all of the vehicles.

In one or more exemplary embodiments, the steering arm can be coupled to the axle journal via at least one connecting means. For example, the at least one connecting means can be a detachable connecting means, such as, but not limited to, screws, bolts, rivets, etc. Other forms and configurations for the connecting means also are possible according to one or more contemplated embodiments. The use of the at least one connecting means to couple the steering arm and the axle journal can provide for a simple and process-reliable connection. For example, replacement of a steering arm can be carried out easily and with little or no additional costs.

In one or more exemplary embodiments, the arrangement of the flange can allow for an otherwise narrow-walled axle journal since other walls of the axle journal do not need to have an increased thickness in order to enable the connecting means to be received. For example, a connection plane between the flange of the axle journal and the base of the steering arm can run perpendicular to the bending plane. As a result, a durable connection can be made between the axle journal and the steering arm, in which the connecting means (e.g., the coupled base/flange) is subject to tensile stress only.

In one or more exemplary embodiments, the base of the steering arm can be supported on the flange of the axle journal in a planar manner so as to provide a high bending stiffness for the connection. The flange can have at least one through-hole to receive a connecting means, wherein the connecting means can be arranged in the base of the steering arm. Alternatively, a plane of the connection between the axle journal flange and the steering arm base can be parallel to the bending plane.

In one or more exemplary embodiments, the steering arm can have a coupling section at its free end. The coupling section can receive the steering movement being transferred. For example, the coupling section of the steering arm can be connected to a steering linkage of the vehicle.

In one or more exemplary embodiments, the axle journal can be formed from a different material than the steering arm. For example, the steering arm can be manufactured from a material that is more resilient (or flexible) than a material from which the axle journal is formed. The material of the steering arm may thus be less brittle than the material of the axle journal, for example. Since the steering arm can be separately produced, the axle journal can be manufactured from a more brittle material, for example, cast iron. It may be disadvantageous to expose a brittle material to high loads, in particular, loads requiring elastic resilience. Thus, the fabrication of the steering arm separate from the axle journal allows for a different, more suitable (e.g., more resilient and/or bendable) material to be used for the steering arm.

In one or more exemplary embodiments, the steering arm can be formed from materials that exhibit high resiliency. Materials for the steering arm also can be selected to avoid hysteresis. For example, the steering arm can be formed from one or more metals. In order to allow for a wide elastic deflection capacity of the steering arm, the metal for the steering arm may be a spring steel, for example. As a result, intermittent or occasional high bending can be accommodated by the steering arm. At the same time, since the metal used for the steering arm does not cause hysteresis within the steering chain, a precise, coordinated steering performance can thereby be achieved.

The axle journal may be formed by casting, forging, or by machining (e.g., a chip-removing process). For example, the axle journal may be formed from cast iron GGG40 or aluminum. Alternatively or additionally, the axle journal can be formed from a combination of materials, for example, a combination of cast iron GGG40 and aluminum. The use of a composite material for the axle journal also is possible according to one or more contemplated embodiments.

In one or more exemplary embodiments, the articulated connection can serve as the front articulated connection of a vehicle suspension. Alternatively or additionally, the articulated connection may be part of a vehicle's rear suspension, insofar as the rear suspension is to be configured to be steerable and is thereby intended to exhibit the positive properties of the disclosed bendable steering arm. Due to the elastic deflection capacity of the steering arm, the transfer of any vibrations in the case of rear-wheel steering, for example, can in this way be reduced to a minimum. A similar advantage occurs when the disclosed articulated connection is installed in the front suspension.

In one or more exemplary embodiments, the suspension of the vehicle may comprise a MacPherson front-wheel suspension. Alternatively, the suspension of the vehicle may comprise individual rods, in which a spring element and a shock absorber element are arranged separately from one another.

Figure 1:
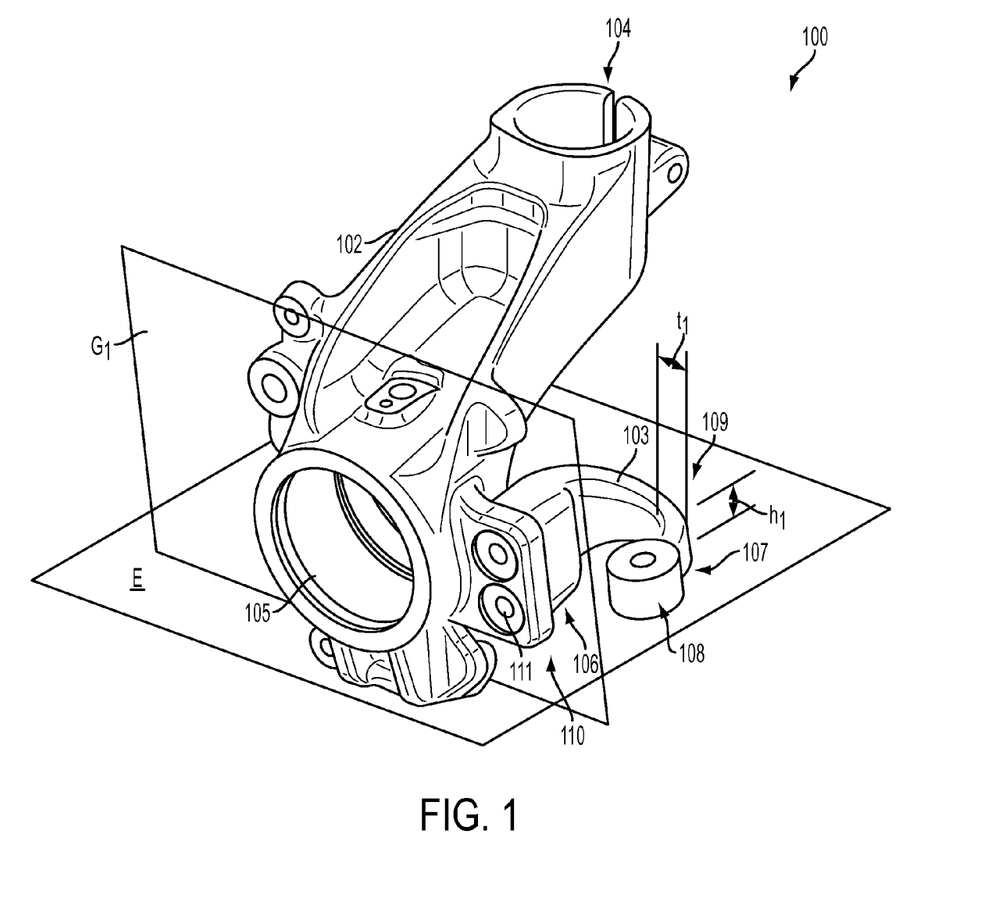
FIG. 1 is a perspective view of an articulated connection with a curved steering arm, according to one or more embodiments of the disclosed subject matter.

Turning to the figures, FIG. 1 shows a perspective view of an articulated connection 100 according to one or more embodiments of the disclosed subject matter. The articulated connection 100 comprises an axle journal 102 and a steering arm 103 connected to the axle journal 102. The steering arm 103 is formed of a material different from that of axle journal 102. Such different material may be in terms of composition or mechanical properties. In particular, steering arm 103 is formed of a material such that steering arm 103 is considered bendable. Thus, by appropriate selection of the material for steering arm 103, it can be elastically deflected in at least one direction (e.g., within plane E) with respect to the axle journal 102.

The axle journal 102 can have a first opening 104 for receiving a spring strut tube (not shown), in which tube a shock absorber (not shown) can be disposed. The spring strut tube can have a spring plate (not shown). The articulated connection 100 can form a MacPherson suspension strut by including a spring (not shown) disposed about a section of the shock absorber and placed on the spring plate. Alternatively, a screw connection (not shown) can be provided between the axle journal 102 and the spring strut tube, where receiving opening 104 has a corresponding internal or external thread (not shown).

The axle journal 102 further has a second opening 105 for receiving a wheel bearing (not shown). The second opening 105 is disposed at a substantially right angle with respect to the first opening 104. Alternatively, the first opening 104 and the second opening 105 may be oriented with respect to one another at an angle that deviates from the perpendicular offset arrangement illustrated in FIG. 1.

As discussed above, the steering arm 103 can be formed independent of the axle journal 102 and thus can be subsequently connected to the axle journal 102. The steering arm 103 can have a base 106 through which the steering arm 103 is connected to the axle journal 102. The steering arm 103 can also have a coupling section 108 at a free end 107 that is at an opposite end of the steering arm 103 from the base 106.

The steering arm 103 can have a curved arm section 109 between the base 106 and its free end 107. The curved arm section 109 of the steering arm 103 extends within a bending plane E, so that the steering arm 103 can be elastically deflected within the bending plane E. The cross-section of the curved arm section 109 can be tapered, for example, from a portion proximal to the base 106 up to the free end 107 of the steering arm 103.

As illustrated in FIG. 1, the curved arm section 109 can have a substantially rectangular cross-section along its length, but with corner regions of the cross-section having a chamfer or rounded transition (e.g., a fillet). The rectangular cross-section of the curved arm section 109 can have a height $h_1$ extending perpendicular to the bending plane E and a width $t_1$ extending within the bending plane E. The height $h_1$ of the cross-section can be greater than the corresponding width $t_1$.

Of course, other geometries for the cross-section of the steering arm are also possible according to one or more contemplated embodiments. For example, the cross-section can be round (e.g., circular), oval (e.g., elliptical), triangular, polygonal (e.g., hexagonal), trapezoidal, or any other shape. In addition, combinations of the aforementioned cross-sectional forms are also possible. However, a rectangular cross-section may enjoy certain advantages, for example, with respect to a ratio of cross-sectional area to strength, which may result in a lower weight as compared to other cross-sectional geometries.

The rectangular cross-section of the curved arm section 109 can extend to the base 106 of the steering arm 103. The cross-section of the base 106 can be wider (in a direction of the width $t_1$) as compared to the curved arm section 109. The increased width of the base 106 may be disposed, for example, toward the free end 107 of the steering arm 103, as illustrated in FIG. 1.

The axle journal 102 can include a flange 110 for connecting the steering arm 103 to the axle journal 102. Base 106 of the steering arm 103 corresponds to flange 110 of the axle journal 102. The steering arm 103 is in contact with the flange 110 via base 106 so that a connection is made between the axle journal 102 and the steering arm 103. The flange 110 can extend perpendicularly to the second opening 105. Thus, a connection plane $G_1$ located between the flange 110 and the base 106 runs perpendicular to the bending plane E.

The flange 110 can have two openings 111, which openings can be through-openings, for example, holes to receive connecting means (not shown). The steering arm 103 can be coupled to the axle journal 102 via two detachable connecting means, for example, arranged in the base 106 of the steering arm 103.

Figure 2:
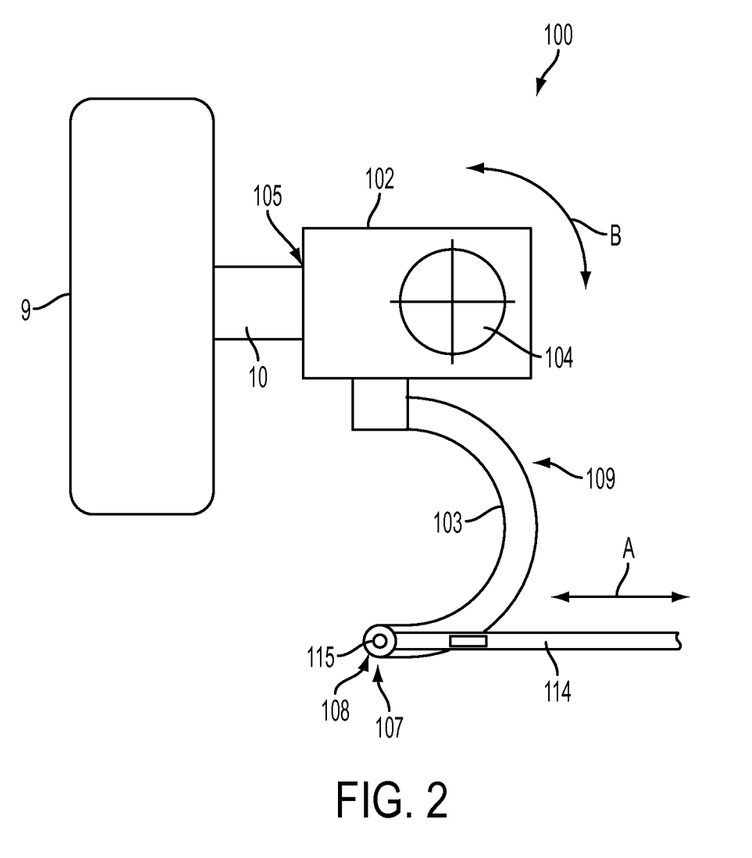
FIG. 2 is a schematic diagram showing a plan view of an articulated connection attached to a wheel and vehicle steering linkage, according to one or more embodiments of the disclosed subject matter.

Turning now to FIG. 2, a plan view of the articulated connection 100 is shown in schematic form with additional elements of a vehicle. Wheel 9 is coupled with axle journal 102 via a wheel axle 10 in order to transfer a steering movement to the wheel 9. The wheel axle 10 can be mounted within a wheel bearing (not shown), which can be disposed in the second receiving opening 105, such that wheel 9 is rotatably connected to the axle journal 102.

Rotational movement of a steering wheel is first converted into a translational motion A of steering linkage 114, which is attached to coupling section 108 of steering arm 103 via an appropriate connection 115. For example, connection 115 can include a ball joint. Translation A of the steering linkage 114 is then converted into a rotational motion B of the articulated connection 100 via steering arm 103. This is possible because axle journal 102 is held in place but allowed to rotate about an axis running through the first opening 104, for example, by a spring strut tube. By translating the steering linkage 114 (e.g., translation A) which is attached to steering arm 103, the position of the steering arm can be changed thereby rotating the axle journal 102 (e.g., rotation B).

Figure 3A:
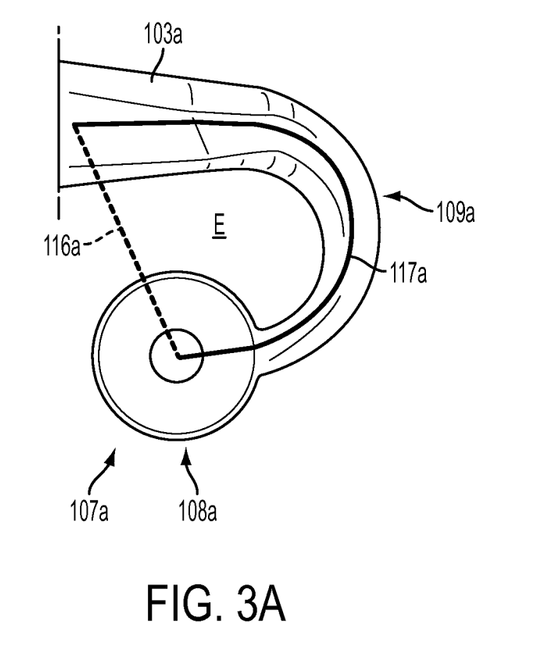
FIGS. 3A-3B illustrate plan views of curved steering arms and their extension within a bending plane, according to one or more embodiments of the disclosed subject matter.
Figure 3B:
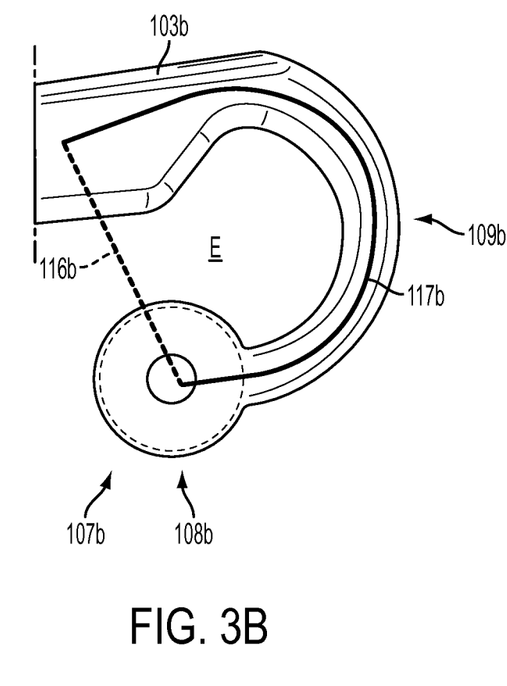

Turning to FIGS. 3A-3B, close-up plan views illustrating the curvature of different steering arms in the bending plane E are shown. In FIG. 3A, steering arm 103a has a curved section 109a between its base and its free end 107a where the coupling section 108a is disposed. In FIG. 3B, steering arm 103b has a curved section 109b between its base and its free end 107b where the coupling section 108b is disposed. In each case, the length of the effective lever arm 116a, 116b (i.e., the length between the coupling section 108a, 108b and the respective base in the bending plane E) is substantially less than the actual length 117a, 117b of the respective arm 103a, 103b.

Moreover, sections 109a, 109b can be curved such that sections 109a, 109b are spaced from a line (e.g., lever arm 116a, 116b) connecting the coupling section 108a, 108b and the respective base. For example, the steering arm 103a, 103b may be C-shaped or U-shaped in the plan view (i.e., in a plane parallel to the translation motion A and parallel to a line, e.g., lever arm 116a, 116b, connecting the coupling section 108a, 108b and the respective base).

Figure 4:
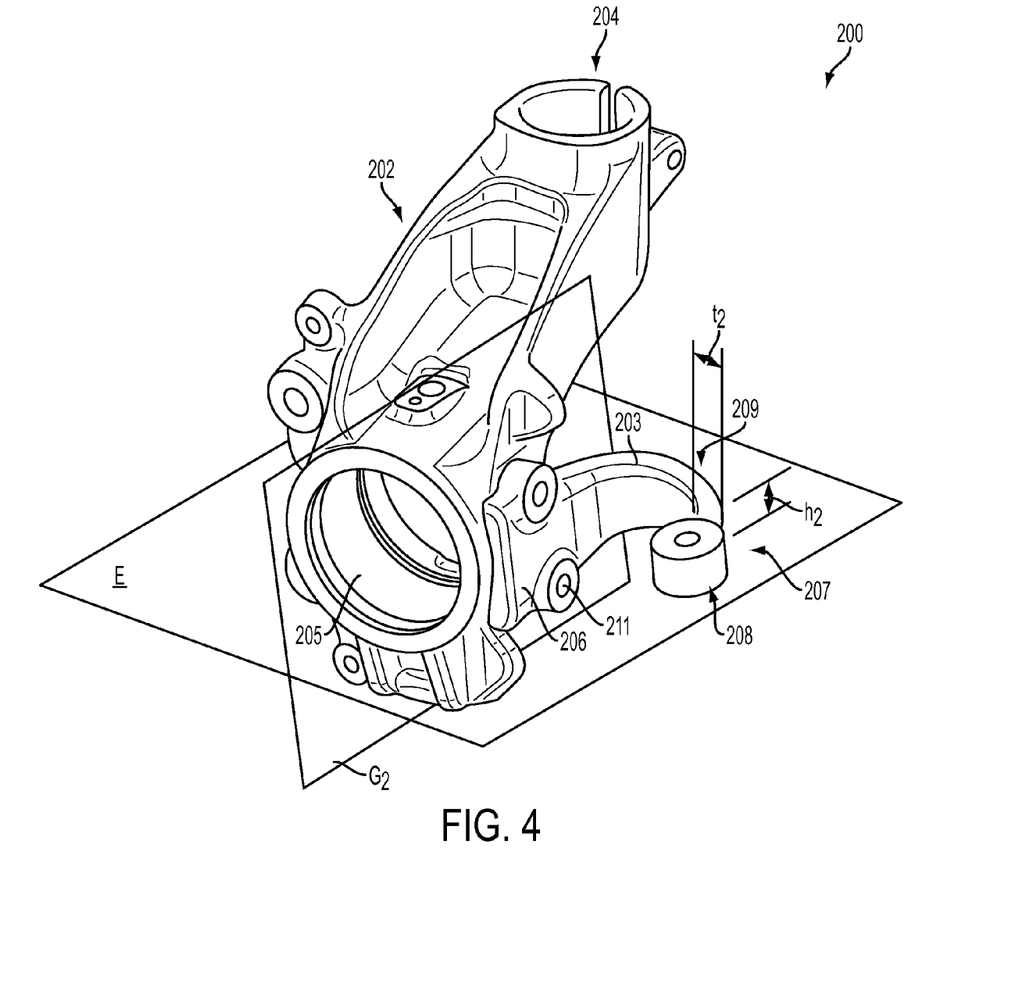
FIG. 4 is a perspective view of another articulated connection with a curved bending arm, according to one or more embodiments of the disclosed subject matter.

Another embodiment of an articulated connection 200 is illustrated in FIG. 4. The articulated connection 200 comprises an axle journal 202 and a steering arm 203 connected to the axle journal 202. The axle journal 202 can have a first opening 204 for receiving a spring strut tube (not shown), in which tube a shock absorber (not shown) can be disposed. The axle journal 202 further has a second opening 205 for receiving a wheel bearing (not shown).

As discussed above, the steering arm 203 can be formed of a material different from that of axle journal 202 so that the steering arm 203 is bendable in a plane E. Thus, the steering arm 203 can be subsequently connected to the axle journal 202. In contrast to the embodiment of FIG. 1, axle journal 202 does not include a flange. Rather, steering arm 203 is fixed directly to a surface of the axle journal 202. As a result, the connection plane $G_2$ remains perpendicular to the bending plane E but orthogonal to the connection plane $G_1$ of FIG. 1. In particular, the connection plane $G_2$ can be parallel to an axis of the second opening 205.

The steering arm 203 can have a base 206 through which the steering arm 203 is connected to the surface of the axle journal 202. The steering arm 203 can also have a coupling section 208 at a free end 207 that is at an opposite end of the steering arm 203 from the base 206, with a curved arm section 209 in between, as described in detail above. The curved arm section 209 can have a substantially rectangular cross-section that is tapered along its length, but with corner regions of the cross-section having a chamfer or rounded transition (e.g., a fillet). The rectangular cross-section of the curved arm section 209 can have a height $h_2$ extending perpendicular to the bending plane E and a width $t_2$ extending within the bending plane E. The height $h_2$ of the cross-section can be greater than the corresponding width $t_2$. As noted above, embodiments of the disclosed subject matter are not limited to a rectangular cross-section and other shapes for the steering arm cross-section also are possible according to one or more contemplated embodiments.

The base 206 can have two openings 211, which openings align with respective openings in the surface of the axle journal 202, to allow attachment of the steering arm 203 to the axle journal 202. For example, the steering arm 203 can be coupled to the axle journal 202 via two detachable connecting means arranged in the base 206 of the steering arm 203.

In contrast to the embodiment of FIG. 1, axle journal 202 does not include a flange. Rather, steering arm 203 is fixed directly to a surface of the axle journal 202. As a result, the connection plane $G_2$ is perpendicular to the bending plane E but orthogonal to the connection plane $G_1$ of FIG. 1. In particular, the connection plane $G_2$ can be parallel to an axis of the second opening 205.

Figure 5:
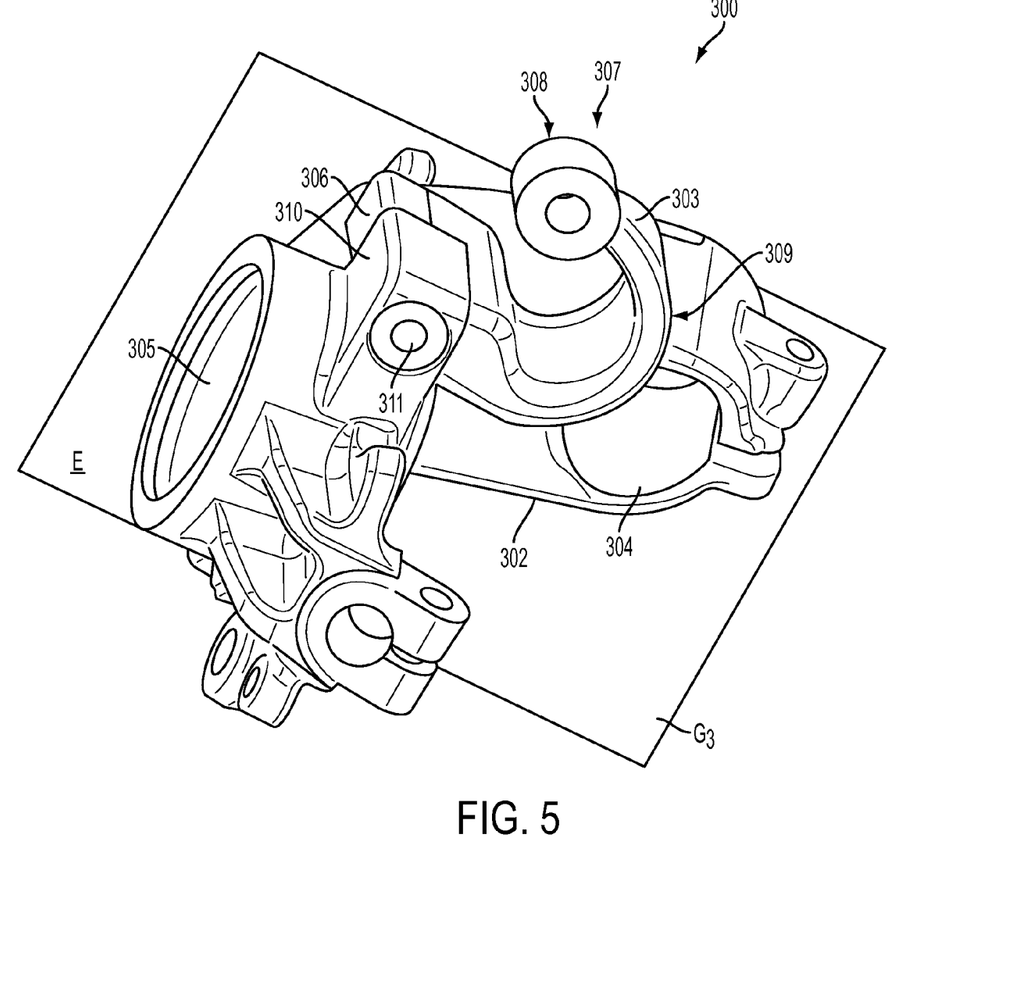
FIG. 5 is an underside perspective view of yet another articulated connection with a curved bending arm, according to one or more embodiments of the disclosed subject matter.

Another embodiment of an articulated connection 300 is illustrated in FIG. 5. The articulated connection 300 comprises an axle journal 302 and a steering arm 303 connected to the axle journal 302. The axle journal 302 can have a first opening 304 for receiving a spring strut tube (not shown), in which tube a shock absorber (not shown) can be disposed. The axle journal 302 further has a second opening 305 for receiving a wheel bearing (not shown).

As discussed above, the steering arm 303 can be formed of a material different from that of axle journal 302 so that the steering arm 303 is bendable in a plane E. Thus, the steering arm 303 can be subsequently connected to the axle journal 302. Compared with the views shown in FIGS. 1 and 4, articulated connection 300 is inclined in its perspective, so that the view from below (e.g., into the first receiving opening 304) is unobstructed.

The steering arm 303 can have a base 306 through which the steering arm 303 is connected to the surface of the axle journal 302. The steering arm 303 can also have a coupling section 308 at a free end 307 that is at an opposite end of the steering arm 303 from the base 306, with a curved arm section 309 in between, as described in detail above. The curved arm section 309 can have a substantially rectangular cross-section that is tapered along its length, as also described in detail above.

In contrast to the articulated connection illustrated in FIGS. 1 and 4, the connection plane $G_3$ in FIG. 5 extends between flange 310 and the base 306 of the steering arm 303. Connection plane $G_3$ is thus not perpendicular to the bending plane E, but parallel to it. Furthermore, a single through-opening 311 can be provided within flange 310 in order to arrange a connection means (not shown) within the base 306 of the steering arm 303.

In exemplary embodiments, the steering arm can be made from a material different than the axle journal so that that steering arm can be made flexible. In such cases, the steering arm can be fabricated separately and assembled to the axle journal post fabrication. In some cases, the separate fabrication and subsequent alignment and assembly to the axle journal may increase fabrication costs. In addition, the steering arm must be in a position to transfer high forces precisely and safely while also exhibiting an adequate response. Thus, there may be a compromise between stiffness of the steering arm with respect to the application of force of different degrees when designing the steering arm.

In one or more exemplary embodiments, an articulated connection can be provided in which the steering arm is provided as an integral part of the axle journal (e.g., formed of a single material). The steering arm can be bendable so that it can be elastically deflected with respect to the axle journal. Because the steering arm is an integral part of the articulated connection, fewer individual parts need to be fabricated and connected together. As a result, fewer production steps are needed, thereby yielding a more economical method of manufacture for an articulated connection of this kind. The articulated connection produced in this manner also can retain the positive properties of the bendable steering arm, since the steering arm can be elastically deflected with respect to the axle journal because of its design. The elastic deflection capacity of the steering arm can be in at least one direction.

Because the steering arm is an integral component of the axle journal composed of a single material, the material properties of the steering arm may initially be the same or similar to those of the axle journal. However, it is possible, according to one or more contemplated embodiments, for the material properties of the steering arm to be changed, for example, by selective heating or subsequent hardening of the steering arm with respect to the remainder of the axle journal. Alternatively or additionally, the semi-finished product used for production may comprise at least two integral components composed of a single material which differ from one another in their material properties.

The deflection capacity characteristic of the steering arm can be configured by the cross-sectional form of the steering arm. As a result, the steering arm can have a required modulus of resistance in the direction or directions of its desired elastic deflection capacity. Thus, the desired bending behavior can be set. In one or more embodiments, the steering arm may have a uniform cross-section over its longitudinal extension.

In one or more exemplary embodiments, the cross-section of the steering arm can vary over the longitudinal extension of the steering arm, for example, by having a larger cross-section where moment loads are anticipated to be greater. Because the steering arm acts as a cantilever extending from the axle journal, the greatest moment load usually occurs where the steering arm originates on the axle journal. Thus, a cross-section of the steering arm may be greater closer to the axle journal. Alternatively or additionally, the changing cross-sectional form of the steering arm can be adapted to the profile of the moment load in each case.

In one or more exemplary embodiments, the steering arm may have selectively introduced cross-sectional changes or through-openings, in order to achieve a desired performance with respect to the flexibility thereof.

In one or more exemplary embodiments, the axle journal and steering arm may be fabricated by casting, forging, machining (e.g., a chip-removing process), or a combination of any of the aforementioned methods. The axle journal and steering arm can be fabricated from any suitable metal, such as, but not limited to, iron or aluminum.

In one or more exemplary embodiments, a limiting device can be provided. The limiting device can be designed to limit an amount of deflection of the steering arm in at least one direction. In other words, the flexibility of the steering arm can be limited in at least one direction using the limiting device by setting a maximum elastic deflection capacity with respect to the axle journal. As a result, the steering arm need not be designed to handle peak loads. Rather, it can be primarily designed for elastic deflection when forces are small. Because the steering arm is readily bendable for small loads, a durability of the steering arm may be compromised, and it may experience excessive deflection above a given force level or even fail (e.g., by breaking from the axle journal). The limiting device can operate to limit the deflection capacity of the steering arm such that the possibility of plastic deformation of the steering arm (or even failure thereof due to breakage) is effectively prevented, or at least reduced, when the steering arm is subjected to high forces. By virtue of the limiting device, adequate flexibility and high load capacity can be achieved using the same articulated connection.

In one or more exemplary embodiments, the limiting device may be configured as a tension member, for example, which prevents or at least impedes further deflection beyond a predetermined deflection range of the steering arm. Alternatively or additionally, the limiting device may be configured as a pressure member. As a result, the steering arm can be retained by the limiting device within a predetermined deflection width of the steering arm. In one or more embodiments, the limiting device may be configured to provide an abrupt or progressive limiting action as the deflection of the steering arm increases. A combination of one or more of the above noted features of the limiting device is also possible according to one or more contemplated embodiments.

In one or more exemplary embodiments, the limiting device can be dynamically adapted depending on the particular driving conditions, i.e., without respect to the actual load applied to the steering arm. For example, the spacing of a region of the limiting device from the steering arm can be dynamically changed. As a result, the steering arm bends through a different distance or along a different path until the limiting action of the limiting device takes effect.

In one or more exemplary embodiments, the limiting device can be arranged, for example, on a portion of the vehicle separate from the axle journal and the steering arm, depending on the requirements in each case and/or the spatial conditions. Such a limiting device may allow for a larger deflection range of the steering arm when the vehicle is driving straight, for example, due to the distance between the limiting device and the steering arm. As the steering angle increases and with the associated rotation of the steering arm about the rotational axis of the axle journal, the axle journal may shift toward the limiting device such that the available clearance between the limiting device and the steering arm is reduced. For example, as the steering angle increases, the available deflection of the steering arm can be reduced in a linear manner.

In one or more exemplary embodiments, the limiting device can be arranged on the axle journal. The effect of such a limiting device can be independent of the steering angle and the transverse force loads occurring on the steering arm may be the primary focus. Alternatively, the limiting device may be configured such that the effect thereof is dependent on the steering angle, despite the arrangement on the axle journal.

In one or more exemplary embodiments, the limiting device may comprise a first limiting arm. The limiting arm may extend in a same direction as the steering arm. The steering arm may be disposed with respect to the limiting arm such the steering arm can be retained in at least one direction of its deflected state against the limiting arm. For example, contact between the limiting arm and the steering arm at an advantageous point can take place by the limiting arm extending parallel to the steering arm. For example, the limiting arm may be arranged within or outside the plane of the steering arm in which the desired deflection thereof is to take place.

In one or more exemplary embodiments, the limiting arm may function as a limit stop. For example, the steering arm may come to rest against or be retained by the limit stop after a predetermined degree of deflection. As a result, the deflection of the steering arm can be limited by the limiting arm in one direction. The limiting device may take any suitable form to limit deflection of the steering arm. For example, the limiting arm may have a U-shaped configuration (or L-shaped configuration for each arm or leg of the device) and enclose at least a portion of the steering arm. As a result, the legs of the U-shape can act as end stops between which the steering arm can otherwise move freely. The deflection capacity of the steering arm can thus be limited in two opposite directions.

In one or more exemplary embodiments, the limiting device can include first and second limiting arms. Both or either of the first and second limiting arms can extend in a same direction as the steering arm. The steering arm can be arranged between the first limiting arm and the second limiting arm, for example, such that the limiting device and the steering arm together have a W-shaped configuration in plan view. As a result, deflection of the steering arm in opposite directions can be restrained by the two limiting arms.

In one or more exemplary embodiments, the steering arm can be arranged in a plane different from one or both of the limiting arms. For example, the steering arm, first limiting arm, second limiting arm, or any combination thereof can have a projection that provides limiting contact between the steering arm and the corresponding limiting arm.

In one or more exemplary embodiments, the deflection of the steering arm is limited in at least one direction. In one or more embodiments, the deflection of the steering arm is limited in at least two opposite directions.

In one or more exemplary embodiments, the steering arm may exhibit a greater understeer tendency with respect to low transverse forces. However, when high transverse forces are encountered, for example, due to potholes or wheel impact with the curbside, the steering arm does not need to rely on its own resistance to withstand the encounter. Instead, above a predetermined deflection amount of the steering arm, the limiting device supplements the steering arm by providing a limiting effect (or at least a damping effect).

In one or more exemplary embodiments, the steering arm can be designed with a shorter extension, for example, to allow for a quicker response. Since transverse forces are received in a region at the free end of the steering arm, a length of a lever arm of the steering arm is correspondingly reduced as the length of the steering arm decreases. As a result, the steering movement applied the steering arm can be transferred to the axle journal and therefore to the wheel more directly.

In one or more exemplary embodiments, the axle journal and the steering arm can be integrally formed. In addition, the steering arm and the limiting device can be composed of a single material (e.g., also integrally formed). The steering arm can be spaced apart from the limiting device by at least one cutout or recess. For example, the recess can be formed from a free end of the steering arm (e.g., by machining from the free end), and can extend between the steering arm and at least one of the limiting arms of the limiting device.

In one or more exemplary embodiments, the limiting device and the steering arm may initially form an integral unit (e.g., a monolithic portion of the axle journal), which is later formed into the separate limiting device and steering arm structures during the fabrication process, for example, by introducing one or more recesses (e.g., via machining). Alternatively or additionally, a recess may be formed at the same time as forming the limiting device and the steering arm. Subsequent introduction of the recess to separate the integral steering arm and limiting device may allow for more precise fabrication. For example, high dimensional stability and precise balance between the limiting device and the steering arm can be achieved using controlled tools (e.g., computer controlled machining).

In one or more exemplary embodiments, the axle journal, the steering arm and the limiting device can all be formed from a single piece of material. The limiting arm or limiting arms of the limiting device can be separated from the steering arm by the arrangement of one or more recesses.

In one or more exemplary embodiments, the articulated connection may have an initial form that can be used as a base form or template, which may be adapted to different vehicles or series. Thus, the specific properties of the steering arm, including its allowed deflection range (i.e., defined by placement and structure of the limiting device) and its modulus of resistance, can be customized to the vehicle or vehicle series by appropriate design and formation of the recess. Additional adjustments to the desired stiffness of the steering arm can be achieved by modifying the cross-section of the steering arm.

In one or more exemplary embodiments, the steering arm can have a coupling section at its free end. The coupling section can receive the steering movement for transfer to the wheel. For example, the coupling section of the steering arm can be attached to a steering linkage of the vehicle. It may be advantageous for the steering arm to have at least the coupling section contact the limiting device in the retained state (i.e., the state where further deflection of the steering arm is restrained by the limiting device). The coupling section can be designed for this purpose, so that the limiting effect of the limiting device takes place through the contact thereof with the coupling section of the steering arm. The contact region between the coupling section and the limiting device can exhibit a positive engagement, at least in part, in order to transfer the forces from the steering arm in its retained state to the limiting device safely and with as little wear as possible.

In one or more exemplary embodiments, at least a portion of the steering arm between the free end of the steering arm and the axle journal can contact a limiting part of the limiting device in the retained state. Thus, the limiting contact between the limiting device and the steering arm can occur in a region of the steering arm that may have certain advantages for design or system requirements.

In one or more exemplary embodiments, the contact region may be arranged between the coupling section of the steering arm and the origin thereof on the axle journal. Thus, a section of the steering arm would project beyond the contact region in a direction parallel to the extension of the steering arm. As a result, the steering arm may still exhibit a residual flexibility in its retained state (i.e., once the contact region impacts the limiting device during deflection). This residual elastic deflection capacity of the steering arm may allow for high steering precision in the retained state.

In one or more exemplary embodiments, the steering and limiting arms can be balanced with respect to each other such that, when contact occurs between the two, contact is made over a larger portion of the steering arm. The contact regions can be designed such that maximum forces are transferred, while taking into consideration material and weight considerations.

In one or more exemplary embodiments, an improved articulated connection is provided that allows for quicker and more cost-effective production while still providing a flexible steering arm. The arrangement of a limiting device helps mitigate any needed compromise in the design of the steering arm with respect to stiffness to accommodate different degrees of forces. Thus, the steering arm can be designed with a reduced stiffness to allow for quick response. Precise operation of the vehicle is assured because the steering arm can be restrained by the limiting device once the steering arm has deflected sufficiently in response to a given load.

Figure 6:
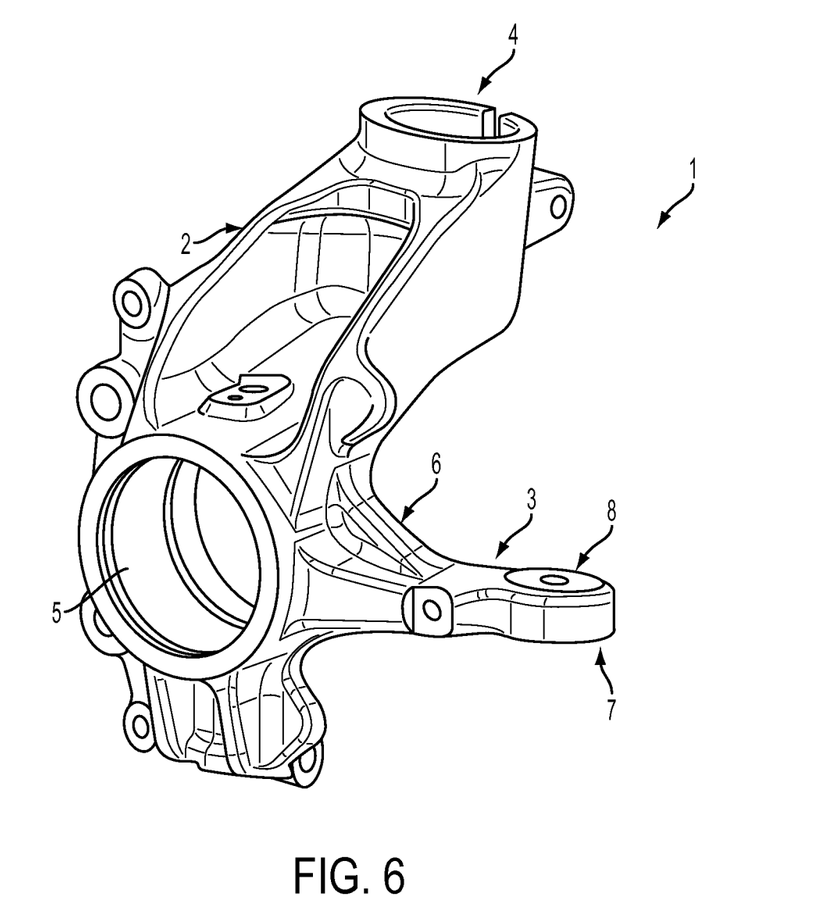
FIG. 6 is a perspective view of an articulated connection, according to one or more embodiments of the disclosed subject matter.

Turning again to the figures, FIG. 6 shows a perspective view of an articulated connection 1, which comprises an axle journal 2 and a steering arm 3 extending from the axle journal 2. The steering arm 3 can be configured in a bendable fashion such that it can be elastically deflected in at least one direction with respect to the axle journal 2. The steering arm 3 can be configured as an integral component of the axle journal 2. For example, both the steering arm 3 and the axle journal 2 can be formed from a single material.

The axle journal 2 can be provided with a first receiving opening 4 for a spring strut tube (not shown), in which tube a shock absorber (not shown) can be disposed. The spring strut tube can have a spring plate (not shown). In order to complete the present articulated connection 1 to form a MacPherson suspension strut, a spring (not shown) can be disposed about a section of the shock absorber and can be placed on the spring plate. Other configurations for the axle journal and suspension system components are also possible according to one or more contemplated embodiments. For example, the axle journal can have a screw-on damper, in which case, a receiving opening for a spring strut tube may be dispensed with.

The axle journal 2 can have a second receiving opening 5 that can be used to receive a wheel bearing (not shown). The second receiving opening 5 can be disposed in an alignment substantially offset from the first receiving opening 4. For example, the second receiving opening 5 can be disposed with an axis that is at a substantially right angle with respect to an axis of the first receiving opening 4.

Steering arm 3 can have a coupling section 8 at a free end 7. Free end 7 can be arranged opposite to the origin 6 of the steering arm 3 on the axle journal 2.

Figure 7:
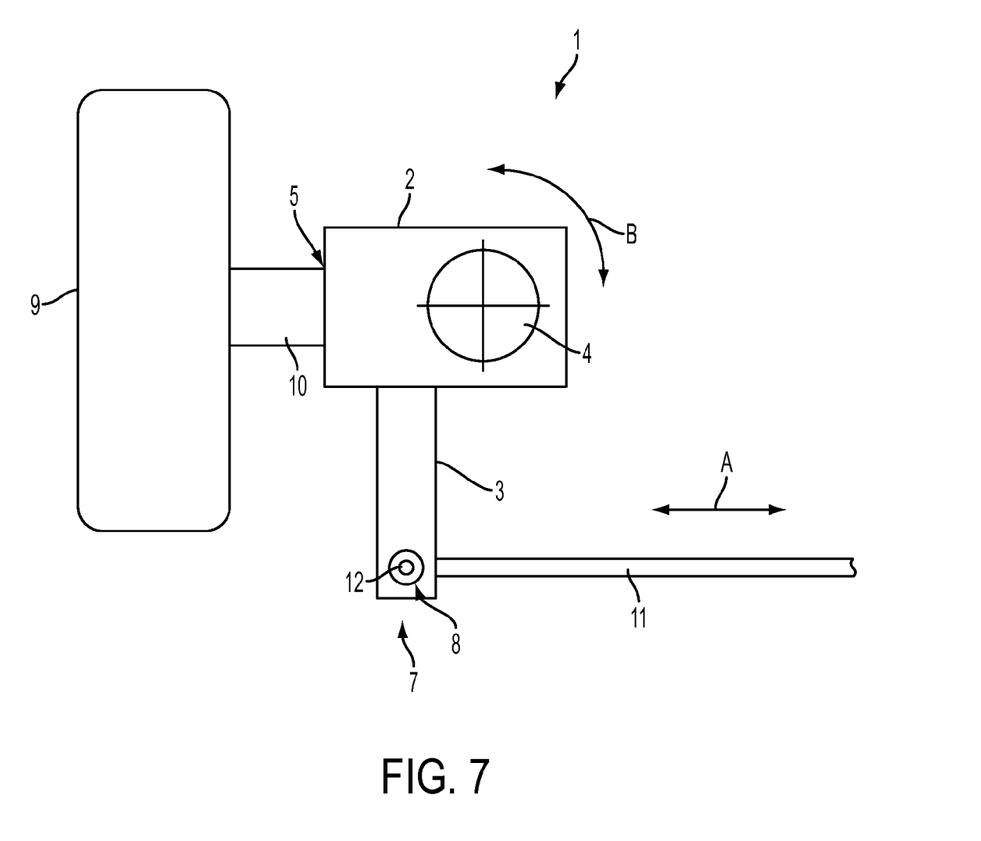
FIG. 7 is a schematic diagram showing a plan view of an articulated connection attached to a wheel and vehicle steering linkage, according to one or more embodiments of the disclosed subject matter.

In FIG. 7, a plan view of a schematic representation of an articulated connection 1 in combination with additional elements is shown. A wheel 9 is coupled with axle journal 2 via a wheel axle 10 such that a steering movement can be coupled to the wheel 9. The wheel axle 10 can be mounted within a wheel bearing (not shown) that is disposed in the second receiving opening 5. As a result, the wheel 9 can be connected to the axle journal 2 and guided rotatably thereto.

In order to transfer a steering movement to the wheel 9, a rotational movement of a steering wheel can be converted into translation A of a steering linkage 11, which is attached to coupling section 8 of steering arm 3 via a suitable connection 12. For example, the connection 12 may include a ball joint. The translation A of the steering linkage 11 can be converted into a rotatory movement B of the articulated connection 1 via the steering arm 3 since the axle journal 2 is rotatably guided about an axis running through the first receiving opening 4 for the spring strut tube, for example. Rotatory movement B of the entire articulated connection 1 about the rotational axis is possible by virtue of the connection of the steering arm 3 to the axle journal 2 and the connection of the steering arm 3 to the steering linkage 11.

Figure 8:
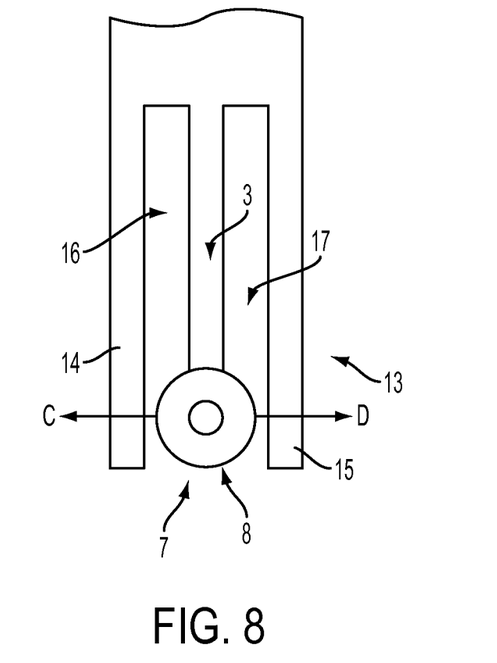
FIG. 8 is a schematic diagram showing a close-up view of a steering arm and limiting device of an articulated connection, according to one or more embodiments of the disclosed subject matter.

FIG. 8 shows a close-up view of a steering arm 3 with a limiting device 13. The limiting device 13 can limit an amount of travel (i.e., deflection range) of the steering arm 3 during elastic deflection. For example, the limiting device 13 can be provided on the axle journal 2 and can include a first limiting arm 14 and a second limiting arm 15. The first limiting arm 14 and the second limiting arm 15 each can extend in a same direction as the steering arm 3. As illustrated in FIG. 3, the steering arm can be arranged between the first limiting arm 14 and the second limiting arm 15. Deflection of the steering arm 3 in opposite directions C, D is limited by the first limiting arm 14 and the second limiting arm 15, respectively.

The limiting device 13 and the steering arm 3 can be integral components with the axle journal 2 and thus formed from the same material. Because of the configuration of the limiting device 13, the articulated connection can offer adequate flexibility simultaneously with high load bearing ability.

As further illustrated in FIG. 8, the steering arm 3 at its free end 8 can be spaced apart from the limiting device 13 by a first recess 16 and a second recess 17. The two limiting arms 14, 15 and the steering arm 3 may be separated from each other only by the respective recesses 16, 17 and thus spaced apart from one another. As a result of the clearance offered by the two recesses 16, 17, the steering arm 3 can deflect from its normal position (e.g., a centered, un-actuated position as illustrated in FIG. 8) in either direction C or D until it contacts one of the limiting arms 14, 15. When it contacts the limiting arms 14, 15, the steering arm 3 may exhibit at least sectional contact of coupling section 8 with the limiting arms 14, 15.

Figure 9:
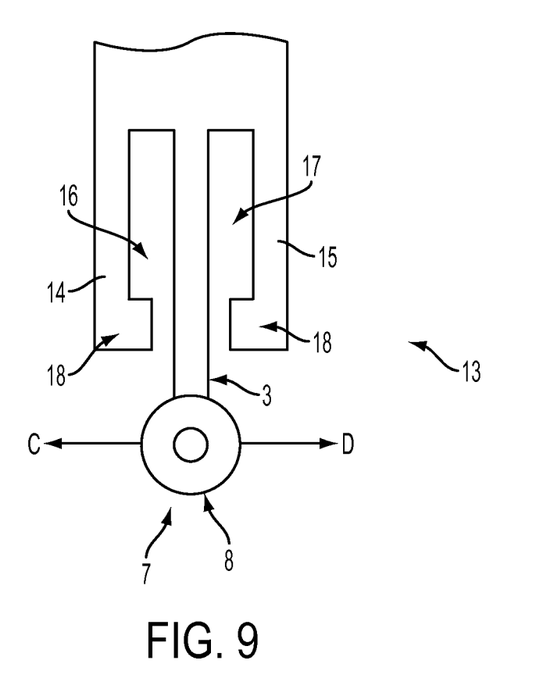
FIG. 9 is a schematic diagram showing a close-up view of another steering arm and limiting device of an articulated connection, according to one or more embodiments of the disclosed subject matter.

FIG. 9 illustrates another embodiment of a limiting device 13 and a steering arm 3, where the limiting arms 14, 15 of the limiting device 13 are shorter as compared to those in FIG. 8.

The limiting arms 14, 15 in FIG. 9 also include portions 18 at respective ends of the arms that are thicker (e.g., in a direction C or D of steering arm displacement) than portions of the limiting arms between the ends and the axle journal. As a result, clearances between the limiting arms 14, 15 and the steering arm 3 achieved by the recesses 16, 17 are reduced as compared to those in FIG. 8. Furthermore, the thickened portions 18 provide an adequate and defined contact area against which the steering arm 3 can rest in its deflected state.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. An articulated connection for transferring a steering movement to a vehicle wheel, the articulated connection comprising:
   an axle journal configured to be coupled to the wheel;
   a steering arm configured to receive a steering movement at a coupling section of a free end of the steering arm and transfer the steering movement to the axle journal, the steering arm being bendable so as to elastically deflect with respect to the axle journal; and
   a limiting device disposed such that at least the coupling section of the steering arm impacts the limiting device to limit an amount of deflection of the steering arm in at least one direction.

2. The articulated connection of claim 1, wherein the limiting device is arranged on the axle journal.

3. The articulated connection of claim 1, wherein the limiting device comprises a first limiting arm extending in a same direction as the steering arm and arranged so as to impact the steering arm to limit the amount of deflection of the steering arm in at least a first direction.

4. The articulated connection of claim 3, wherein the limiting device further comprises a second limiting arm extending in the same direction as the steering arm and arranged so as to impact the steering arm to limit the amount of deflection of the steering arm in at least a second direction opposite to the first direction, and the steering arm is arranged between the first and second limiting arms in plan view.

5. The articulated connection of claim 1, wherein the steering arm, the axle journal, and the limiting device are integral components formed from the single material.

6. The articulated connection of claim 1, wherein the steering arm is spaced from the limiting device by at least one recess.

7. The articulated connection of claim 1, wherein a coupling section is configured to attach the steering arm to a steering linkage of the vehicle.

8. The articulated connection of claim 1, wherein:
   the free end of the steering arm is opposite to the axle journal, and
   the limiting device is disposed such that at least a portion of the steering arm between the free end and the axle journal impacts the limiting device to limit the amount of deflection of the steering arm in the at least one direction.

9. An articulated connection for transferring a steering movement to a vehicle wheel, the articulated connection comprising:
   an axle journal configured to be coupled to the wheel;
   a steering arm configured to receive and transfer the steering movement to the axle journal, the steering arm being bendable so as to elastically deflect with respect to the axle journal; and a limiting device configured to limit an amount of deflection of the steering arm in at least one direction wherein the limiting device has a thicker portion disposed to contact the at least a portion of the steering arm between a free end of the arm and the axle journal, the thicker portion having an increased thickness, relative to a thickness of the limiting device, in the at least one direction.

10. An articulated connection for transferring a steering movement to a vehicle wheel, the articulated connection comprising:

an axle journal configured to be coupled to the wheel; and a steering arm coupled to the axle journal and configured to receive and transfer the steering movement to the axle journal, the steering arm being bendable so as to elastically deflect within a bending plane and with respect to axle journal, a limiting device configured to limit a deflection capacity of the steering arm in two substantially opposite directions.

11. The articulated connection of claim 10, wherein the steering arm is coupled to the axle journal by at least one connecting means.

12. The articulated connection of claim 10, wherein the steering arm has a free end opposite to the axle journal, and the free end has a coupling section configured to receive a steering movement.

13. The articulated connection of claim 12, wherein the coupling section is configured to attach the steering arm to a steering linkage of the vehicle.

14. The articulated connection of claim 10, wherein the axle journal is formed of a different material than that of the steering arm, the material of the steering arm being more resilient than the material of the axle journal.

15. The articulated connection of claim 10, wherein the limiting device has a substantially U-shaped configuration in the bending plane.

16. The articulated connection of claim 10, wherein the limiting device has a substantially W-shaped configuration in the bending plane.

17. An articulated connection comprising:

an axle journal configured to be coupled to a wheel of a vehicle;

a steering arm coupled to the axle journal via a base of the steering arm so as to convert a translational steering movement applied to a coupling section of the steering arm into a rotational movement of the axle journal; and a limiting device extending in a same direction as the steering arm and arranged wherein a bending plane of steering arm to limit a maximum deflection capacity of the steering arm in at least one direction, wherein the bending plane is defined by an elastic deflection of the steering arm.

18. The articulated connection of claim 17, wherein the limiting device has a substantially W-shaped configuration in the bending plane.

19. An articulated connection comprising:

an axle journal configured to be coupled to a vehicle wheel;

a steering arm extending from the axle journal so as to convert a translational steering movement applied to a coupling section of the steering arm into a rotational movement of the axle journal; and one or more limiting devices spaced apart from the steering arm at a free end of the steering arm by a recess and disposed in a bending plane of the steering arm so as to limit an elastic deflection capacity of the steering arm relative to the axle journal in a direction parallel to the translational steering movement.

20. The articulated connection of claim 19, wherein the axle journal, the steering arm, and the one or more limiting devices are formed as an integral piece from a single material.

* * * * *